(12) United States Patent
Boateng et al.

(10) Patent No.: US 8,317,883 B1
(45) Date of Patent: Nov. 27, 2012

(54) PRODUCTION OF STABLE PYROLYSIS BIO-OIL FROM MUSTARD FAMILY SEEDS, MUSTARD FAMILY SEED PRESSCAKE, AND DEFATTED MUSTARD FAMILY SEED PRESSCAKE

(75) Inventors: Akwasi A. Boateng, Royersford, PA (US); Neil M. Goldberg, North Wales, PA (US); Peter B. Johnson, Hanna City, IL (US); Sudhir Seth, Bloomington, IL (US); Charles A. Mullen, Lansdale, PA (US); Serin R. Rao, Peoria, IL (US)

(73) Assignee: The United States of America as Represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 12/907,546

(22) Filed: Oct. 19, 2010

Related U.S. Application Data (63) Continuation-in-part of application No. 12/459,107, filed on Jun. 26, 2009, now abandoned.

(51) Int. Cl.
*C12P 21/00* (2006.01)
(52) U.S. Cl. .......................................... 44/307; 585/241
(58) Field of Classification Search ............... 44/307; 585/241; 435/71.1
See application file for complete search history.

(56) References Cited

U.S. PATENT DOCUMENTS 6,485,841 B1  11/2002  Freel et al.
2010/0279354 A1*  11/2010  de Crecy ................. 435/71.1

OTHER PUBLICATIONS

Boateng, A. et al., "Production of Bio-oil from Alfalfa Stems by Fluidized-Bed Fast Pyrolysis", Ind. Eng. Chem. Res, vol. 47, 2008, pp. 4115-4122.
Boateng, A. et al., "Bench-Scale Fluidized-Bed Pyrolysis of Switchgrass for Bio-oil Production", Ind. Eng. Chem. Res., vol. 46, 2007, pp. 1891-1897.
Parker, I. et al., "Organic Nitrogen Bases from Pyrolysis of Cottonseed Meal", J. A. Chem. Soc., vol. 58 (7), 1936, pp. 1097-1104.
Diaz, L. et al., "Residues and Wastes", Cal Recovery Systems, Inc., Richmond, California, Chapt. 1, pp. 3-25.

\* cited by examiner

*Primary Examiner* — James Goloboy
*Assistant Examiner* — Chantel Graham
(74) *Attorney, Agent, or Firm* — John D. Fado; G. Byron Stover (57) ABSTRACT

Bio-oil from a feedstock selected from mustard family seeds, mustard family seed presscake, mustard family seed defatted presscake, and mixtures thereof. The bio-oil is produced by a method involving (1) pyrolyzing the feedstock to produce bio-oil, bio-char and non-condensable gases, (2) removing the bio-char from the bio-oil, (3) condensing the bio-oil, and (4) precipitating the bio-oil.

19 Claims, 5 Drawing Sheets
(5 of 5 Drawing Sheet(s) Filed in Color)

PRODUCTION OF STABLE PYROLYSIS BIO-OIL FROM MUSTARD FAMILY SEEDS, MUSTARD FAMILY SEED PRESSCAKE, AND DEFATTED MUSTARD FAMILY SEED PRESSCAKE

REFERENCE TO RELATED APPLICATION

This application claims the benefit of U.S. patent application Ser. No. 12/459,107, filed 26 Jun. 2009, which is incorporated herein by reference in its entirety.

BACKGROUND OF THE INVENTION

The present invention relates to bio-oil from a feedstock selected from mustard family seeds (family Brassicaceae; e.g., pennycress, camelina, canola), mustard family seeds presscake, mustard family seeds defatted presscake, and mixtures thereof. The bio-oil may be produced by a process involving pyrolyzing (e.g., at a temperature of about 450° to about 550° C. for about 0.1 second to about 5 seconds) the feedstock to produce bio-oil, bio-char and non-condensable gases; removing the bio-char from the bio-oil; condensing the bio-oil; and precipitating the bio-oil.

There is no doubt that the major barrier to the successful production of biofuels is feedstock production and logistics. About 30-50% of ethanol production cost can be attributed to delivering the feedstock to the refinery (Hess, J. R., et al., Biofuels, Bioprod. Bioref., 1: 181-190 (2007)). To meet requirements for the EPA's renewable fuel standards (RFS2) of 2007, which call for 36 billion gallons of biofuels by 2022, the feedstock challenge must be sustainably met. Out of the 36 billion gallons, corn ethanol is expected to be capped at 15 billion with the remaining 21 billion coming from advanced biofuels from various sources. Oil seeds are already contributing about one-half billion gallons of biodiesel to the RFS with a projected rise to 1 billion gallons by 2022. That means 20 billion gallons of advanced biofuels must come from other resources (e.g., cellulosic; USDA Biofuels Strategic Production Report, Jun. 23, 2010; http://www.usda.gov/documents/USDA_Biofuels_Report_6232010.pdf). USDA is embarking on a massive effort that invests in cross-cutting and trans/multi-disciplinary research efforts in the sustainable feedstock development, preprocessing and feedstock logistics value chain. An array of cellulosic feedstocks Which can be sustainably cultivated on marginal lands and efficiently processed and delivered have been mapped out on a region by region basis. However, efforts to increase oil seeds that are non-food have not been emphasized although they may be noteworthy. Also not accounted fords the potential use of the biomass residue of the oil seed extraction value chain. While some biomass presscakes of certain origins (e.g., soybean and palm fruit) can be a valuable source of protein for animal feed consumption, non-food sources such as jatropha (*Jatropha curcas*) and some from the mustard family such as pennycress (*Thlaspi arvense* L.) may not be used as animal feed because of their potential toxicity due to the presence of glucosinolates (Tripathi, M. K., and A. S. Mishra, Animal Feed Sci. Tech., 132: 1-27 (2007)). Pyrolysis of these presscakes might provide added gallons of advanced biofuels to the RFS. Given the high yield and high concentration of oxygenated hydrocarbons (including aromatic compounds), pyrolysis oil may show promise of producing large amounts of fungible biomass-based hydrocarbon fuels such as gasoline and diesel by employing conventional petroleum refining techniques like hydrotreating and hydrocracking. However, the use of pyrolysis oil has been limited due to stability problems caused by high oxygen content (typically 40 wt %) and high water content. Therefore a typical pyrolysis liquid produced using conventional techniques from cellulosic feedstocks is acidic and, over time, olgiomerizes, increasing viscosity and presenting storage and use problems (Huber, G. W., and A. Corma, Angew. Chem., 46: 7184-7201 (2007)). While pyrolysis oils may be able to provide the source of aromatics needed for formulating jet-range biofuels, the major barrier facing commercialization of pyrolysis liquids as second generation biofuel source has been their instability. However, we have surprisingly found that pyrolysis oils produced from, for example, oil-seed presscakes (mustard family) have considerably reduced oxygen content making them a viable economic resource for sustainable contribution to the RFS.

We have found that the mustard family (Brassicaceae) oil plants (e.g., pennycress, camelina, canola) can serve as a bridge between futuristic feedstocks such as algae for the production of renewable biofuels. De-oiled seedcake biomass (presscake) from the mustard family have no use as animal feed, but these biomass residues contain residual vegetable oils and possess sufficient calorific value that enables them to provide aromatic compounds to the jet blends but only if stable pyrolysis oils are produced from them using our unique techniques.

We have produced surprisingly stable, partially deoxygenated, pH neutral bio-oils from mustard family seeds (e.g., pennycress seeds), mustard family seed presscake pennycress presscake, camelina presscake), and defatted mustard family seed presscake (e.g., defatted pennycress presscake).

SUMMARY OF THE INVENTION

In accordance with the present invention there is provided bio-oil produced from a feedstock wherein the feedstock is selected from mustard seeds, mustard seed presscake, defatted mustard seed presscake, or mixtures thereof;

(a) wherein the bio-oil produced from mustard seeds has the following characteristics:

(1) the average molecular weight and number average weight of the bio-oil changes by <about 5% during 90° C. storage for up to 24 hours, (2) pH of about 6.0 about 8.0, (3) molar C:O of about 4 to about 10:1, (4) has a heating value of about 26,000 to about 38,0001 kJ/kg, (5) contains about 15 to about 35% of the organic oxygen of the seeds from which the bio-oil was produced;

(6) carbon conversion to bio-oil of about 45 to about 90%, and (7) water content of about 1 to about 20%;

(b) wherein the bio-oil produced from mustard seed presscake has the following characteristics:

(1) the number average molecular weight and the weight average molecular weight of the bio-oil decreases <about 20% or increases by <about 5% when the presscake bio-oil is stored at 90° C. for up to 24 hours, (2) pH of about 6 to about 8, (3) molar C:O of about 3.5 to about 8.5:1, (4) has a heating value of about 26,000 to about 38,000 kJ/kg, (5) contains about 14 to about 35% of the organic oxygen of the seeds from which the bio-oil was produced, (6) carbon conversion to bio-oil of about 45 to about 90%, (7) water content of about 1 to about 20%; and (c) wherein the bio-oil produced from defatted mustard seed presscake has the following characteristics:

(1) the number average molecular weight and weight average molecular weight of the bio-oil changes by <5% when said bio-oil is stored at 90° C. for up to 24 hours, (2) pH of about 6.0 to about 9.0, (3) molar C:O of about 3 to about 10, (4) has a heating value of about 25,000 to about 36,000, (5) contains about 15 to about 35% of the organic oxygen of the seeds from which the bio-oil was produced, (6) carbon conversion to bio-oil of about 45 to about 90%, and (7) water content of about 1 to about 20%.

Also in accordance with the invention, there is provided a method for producing bio-oil from a feedstock, comprising (1) pyrolyzing the feedstock to produce bio-oil, bio-char and non-condensable gases; (2) removing the bio-char from the bio-oil; (3) condensing the bio-oil; and (4) precipitating the bio-oil. The feedstock is selected from mustard seeds, mustard seed presscake, defatted mustard seed presscake, or mixtures thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

DETAILED DESCRIPTION OF THE INVENTION

We have produced bio-oil and bio-char from mustard family seeds (e.g., pennycress seeds), mustard family seed presscake (e.g., pennycress presscake, camelina presscake), and defatted mustard family seed presscake defatted pennycress presscake) by fast pyrolysis. The bio-oil was unusually stable and is different from bio-oils produced from other biomass feedstocks or bio-oils conventionally produced from mustard family seeds, mustard family seeds presscake, or defatted mustard family seed presscake.

Fast pyrolysis is a process involving the rapid heating of biomass in the absence of oxygen which produces solids (bio-char), liquids (bio-oil) and non-condensable gases (syngas; Mohan, D., et al., Energy Fuels, 20: 848-889 (2006); Huber, G. W., et al., Chem. Rev., 106: 4044-4098 (2006)). Depending on the feedstock used and the exact process conditions, generally 50-75 wt % of the biomass can be converted to liquid bio-oil (pyrolysis-oil), 10-30 wt % to bio-charcoal, and 5-15 wt % to syn-gas CO, $CO_2$, and light hydrocarbons). Biomass produced bio-oil is a complex mixture of partially oxygenated hydrocarbons, including acids, phenols, aldehydes, ketones, alcohols, furans, and carbohydrates. This is a result of the decomposition of the cellulose, hemicellulose, lignin, and other components of biomass. Bio-oil usually has an energy content of half that of petroleum derived fuels, primarily due to its higher oxygen content. However, conventionally produced bio-oil is generally very unstable because of the high concentration of reactive components present in bio-oil. This instability is a major factor limiting the use of bio-oil as a conventional liquid fuel (for example in boilers) or upgrading to transportation fuels like gasoline or diesel (Diebold, J., NREL, 1: 3-42 (2000); Diebold, J. P., and A. V. Bridgwater, Overview of Fast Pyrolysis of Biomass for the Production of Liquid Fuels, In: Fast Pyrolysis of Biomass: A Handbook, Bridgwater, A. V., Ed., CPL Scientific Publishing, Newbury, U.K., 1999; pp 14-32). However, our invention surprisingly avoids these problems.

By "bio-oil" it is meant the liquid fraction obtained following the fast pyrolysis of a feedstock such as mustard family seeds (e.g., pennycress seeds), mustard family seed presscake (e.g., pennycress presscake, camelina presscake), and defatted mustard family seed presscake (e.g., defatted pennycress presscake). The bio-oil is obtained from the product vapor which is produced along with bio-char following pyrolysis. Upon removal of the bio-char the product vapor is condensed and collected within one or more condensers which are typically linked in series. Bio-oil can refer to a fraction collected at one condensation point or the combination of the precipitated products obtained from all of the condensers and other collection methods (e.g., electrostatic precipitation (ESP)).

Figure 1:
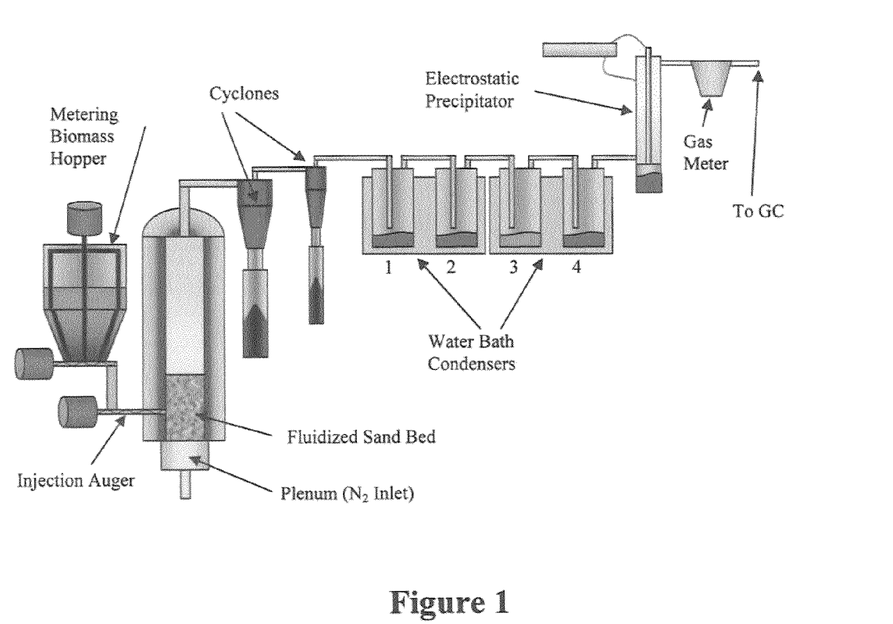
FIG. 1 shows a fluidized bed pyrolysis system as one way in which bio-oil can be made from mustard family seeds (e.g., pennycress seeds), mustard family seed presscake (e.g., pennycress presscake, camelina presscake), and defatted mustard family seed presscake (e.g., defatted pennycress presscake).

Fast pyrolysis of the feedstock utilized M the present invention results in the preparation of product vapors and char. After removal of the char components from the product steam, the product vapors are condensed to obtain a bio-oil product from pyrolysis. Without wishing to limit the scope of the invention in any manner, an example of a pyrolysis system suitable for the pyrolytic treatment of, for example, pennycress presscake or camelina presscake and the production of bio-oil, is described by Boateng et al. (Boateng, A. A., et al., Ind. Eng. Chem. Res., 46: 1891-1897 (2007); Boateng, A. A., et al., Ind. Eng. Chem. Res., 47: 4115-4122 (2008)) and utilizes an inorganic particulate heat carrier, such as sand. Our process for the productions of bio-oil includes a reactor temperature from about 450° to about 550° C. (e.g., 450°-550° C.), preferably about 475° to about 525° C. (e.g., 475°-525° C.), more preferably about 500° C. (e.g., 500° C.), reaction/residence times from about 0.1 to about 5 seconds (e.g., 0.1 to 5 seconds; preferably about 0.1 to about 0.7 second (e.g., 0.1-0.7 second)) followed by a rapid product quench where the products are quickly cooled below about 350° C. (e.g., below 350° C.) within about 0.5 seconds (e.g., 0.5 seconds). With this system the residence times can be carefully regulated in order to optimize the processing of the feedstock and bio-oil yields. However, it is to be understood that while this fast pyrolysis system is preferred, other pyrolysis systems that are capable of producing a bio-oil with characteristics described herein, may also be used. With reference to FIG. 1, briefly, the system includes a feed system (metering biomass hopper), a reactor (fluidized reactor section), cyclones, condensers through which the product vapors produced during pyrolysis are cooled and collected using suitable condenser means, and precipitator (e.g., electrostatic). However, it is to be understood that analogous fast pyrolysis systems, comprising differences in the reactor processes, or that utilize an alternative heat carrier, or different numbers or size of condensers, or different condensing means or precipitating means may be used for the preparation of the bio-oil of the present invention. Preferably, the reactor is capable of producing high yields of bio-oil, for example from about 40 to about 60% by mass (e.g., 40-60%) of the feedstock, preferably about 45 to about 55% (e.g., 45-55%), more preferably about 50% (e.g., 50%).

The present invention relates to mustard family seed bio-oil having has the following characteristics:

(1) molecular weight stability (unlike increasing MW upon storage of conventional biomass bio-oils): after storing at 90° C. for 8 h, surprisingly the average molecular weight and number average weight of the bio-oil remained steady (changed by <about 5% (e.g., <5%)) during 90° C. storage to 8 h and 24 h (e.g., FIG. 4));

(2) neutral pH of about 6.0 to about 8.0 (e.g., 6.0 to 8.0; preferably about 6.4 to about 7.5 (e.g., 6.4 to 7.5)) as compared with acidic pH ~2 in conventional biomass bio-oils;

(3) partial deoxygenation: molar C:O of about 4 to about 10:1 (e.g., 4 to 10:1; preferably about 6.0 to about 8:1'(e.g., 6.0 to 8) whereas conventional biomass pyrolysis oils have ratio of about 1.5:1;

(4) has a heating value of about 26,000 to about 38,000 kJ/kg as is (e.g., 26,000 to 38,000; preferably about 28,000 to about 36,000 (e.g., 28,000 to 36,000)) or 35,500 (dry basis);

(5) contains about 15 to about 35% (e.g., 15 to 35%; preferably about 15 to about 30% (e.g., 15 to 30%)) of the organic oxygen of the seeds from which the bio-oil was produced;

(6) carbon conversion to bio-oil: about 45 to about 90% (e.g., 45 to 90%; preferably about 55 to about 80% (e.g., 55 to 80%));

(7) water content of about 1 to about 20 (e.g., 1 to 20%; preferably about 5 to about 11% (e.g., 5 to 11%)). Mustard seed bio-oil may be produced by a process involving pyrolyzing the seeds to produce bio-oil, bio-char and non-condensable gases; removing the bio-char from the bio-oil; condensing the bio-oil; and precipitating the bio-oil; the only pretreatment of the mustard family seeds is to expose the interior of the seed, for example by grinding or flaking or cracking, and drying (e.g., for about 12 h at about 60° C.).

The present invention relates to pennycress seed bio-oil having the following characteristics: (1) has a pH of about 6.4 (e.g., 6.4); (2) contains about 4 to about 11 wt % water (e.g., 4 to 11 wt %); (3) has a C:O ratio of about 8:1 (e.g., 8:1); (4) contains about 20% (e.g., 20%) of the organic oxygen in the presscake from which the presscake bio-oil was produced; (5) has a heating value of about 34,000 kJ/kg (e.g., 34,000); (6) the number average molecular weight of the bio-oil remains steady (changes by <about 5% (e.g., <5%) when the bio-oil is stored at 90° C. for 24 hours; and (7) the weight average molecular weight of the bio-oil remains steady (changes by <about 5% (e.g., <5%)) when the bio-oil is stored at 90° C. for 24 hours. Pennycress seed bio-oil may be produced by a process involving pyrolyzing the pennycress seeds to produce bio-oil, bio-char and non-condensable gases; removing the bio-char from the bio-oil; condensing the bio-oil; and precipitating the bio-oil.

The present invention also relates to mustard family seed presscake bio-oil. The present invention relates to a mustard seed presscake bio-oil having the following characteristics:

(1) molecular weight stability (unlike increasing MW upon storage of conventional biomass bio-oils): the number average molecular weight of the presscake bio-oil declines or remains steady (decreases <about 20% (e.g., <20%) or increases by <about 5% (e.g., <5%)) when the presscake bio-oil is stored at 90° C. for 8 hours and remains relatively steady thereafter for at least 24 hours, and the weight average molecular weight of the presscake bio-oil declines or remains steady (decreases <about 20% (e.g., <20%) or increases by <about 5% (e.g., <5%)) when the presscake bio-oil is stored at 90° C. for 8 hours and remains relatively steady thereafter for at least 24 hours;

(2) neutral pH: about 6 to about 8 (e.g., 6 to 8; preferably about 6.5 to about 8 (e.g., 6.5 to 8); preferably about 6.5 to about 7.8 (e.g., 6.5 to 7.8); preferably about 7 to about 7.6 (e.g., 7 to 7.6)) as compared with acidic pH ~2 in conventional biomass bio-oils;

(3) partial deoxygenation: molar C:O of about 3.5 to about 8.5:1 (e.g., 3.5 to 8.5:1; preferably about 3.5 to about 7.5:1 (e.g., 3.5 to 7.5:1)) whereas conventional biomass pyrolysis oils have ratio of about 1.5:1;

(4) has a heating value of about 26,000 to about 38,000 kJ/kg (e.g., 26,000 to 30,060; preferably about 26,000 to about 30,000 (e.g., 26,000 to 30,000); preferably about 28,000 to about 30,000 (e.g., 28,000 to 30,000));

(5) contains about 14 to about 35% (e.g., 14 to 35%; preferably about 14 to about 25% (e.g., 14 to 25%)) of the organic oxygen of the seeds from which the bio-oil was produced;

(6) carbon conversion to bio-oil: about 45 to about 90% (e.g., 45 to 90%; preferably about 50 to about 90% (e.g., 50 tO 90));

(7) water content: about 1 to about 20% (e.g., 1 to 20%; preferably about 1 to about 10% (e.g., 1 to 10%); preferably about 5 to about 10% (e.g., 5 to 10). Mustard seed presscake bio-oil may be produced by a process involving pyrolyzing the presscake to produce bio-oil, bio-char and non-condensable gases; removing the bio-char from the bio-oil; condensing the bio-oil; and precipitating the bio-oil.

The present invention also relates to pennycress seed presscake bio-oil. The present invention relates to a pennycress seed presscake bio-oil having the following characteristics: (1) has a pH of about 7.6 (e.g., 7.6); (2) contains about 8 wt % water (e.g., 8 wt %); (3) has a C:O ratio of about 3.5:1 (e.g., 3.5:1); (4) contains about 14% (e.g., 14%) of the organic oxygen in the pennycress presscake from which the pennycress presscake bio-oil was produced; (5) has a heating value of about 29,500 kJ/kg (e.g., 29,500); (6) the number average molecular weight of the pennycress presscake bio-oil declines by about 11% (e.g., 11%) when the pennycress presscake bio-oil is stored at 90° C. for 8 hours and remains relatively steady thereafter for at least 24 hours; and (7) the weight average molecular weight of the pennycress presscake bio-oil declines by about 13 to about 16% (e.g., 13 to 16%) when the pennycress presscake bio-oil is stored at 90° C. for 8 hours and remains relatively steady thereafter for at least 24 hours. Pennycress seed presscake bio-oil may be produced by a process involving pyrolyzing the pennycress presscake to produce bio-oil, bio-char and non-condensable gases; removing the bio-char from the bio-oil; condensing the bio-oil; and precipitating the bio-oil.

The present invention also relates to camelina (e.g., *Camelina sativa*) seed presscake bio-oil. The present invention relates to a camelina seed presscake bio-oil having the following characteristics: (1) has a pH of about 7.5 (e.g., 7.5); (2) contains about 7 to about 9 wt % water (e.g., 7 to 9 wt %); (3) has a C:O ratio, of about 7.5:1 (e.g., 7.5:1); (4) contains about 24% (e.g., 24%) of the organic oxygen in the camelina presscake from which the camelina presscake bio-oil was produced; (5) has a heating value of about 29,700 kJ/kg (e.g., 29,700); (6) the number average molecular weight of the camelina presscake bio-oil declines by about 5 to about 8% (e.g., 5 to 8%) when the camelina presscake bio-oil is stored at 90° C. for 8 hours and remains relatively steady thereafter for at least 24 hours; and (7) the weight average molecular weight of the camelina presscake bio-oil declines by about 5 to about 8% (e.g., 5 to 8%) when the camelina presscake bio-oil is stored at 90° C. for 8 hours and remains relatively steady thereafter for at least 24 hours. Camelina seed presscake bio-oil may be produced by a process involving pyrolyzing the camelina presscake to produce bio-oil, bio-char and non-condensable gases; removing the bio-oil from the bio-char; condensing the bio-oil; and precipitating the bio-oil.

The present invention also relates to mustard family seed defatted presscake bio-oil. The present invention relates to a mustard seed defatted presscake bio-oil having the following characteristics:

(1) molecular weight stability (unlike increasing MW upon storage of conventional biomass bio-oils): the number average molecular weight of the mustard seed defatted presscake bio-oil remains steady (changes by <about 5% (e.g., <5%)) when the mustard seed defatted presscake bio-oil is stored at 90° C. for at least 24 hours, and the weight average molecular weight of the mustard seed defatted presscake bio-oil remains steady (changes by <about 5% (e.g., <5%)) when the mustard seed defatted presscake bio-oil is stored at 90° C. for at least 24 hours;

(2) neutral pH of about 6.0 to about 9.0 (e.g., 6.0 to 9.0; preferably about 7.0 to about 9.0 (e.g., 7.0 to 9.0)) as compared with acidic pH ~2 in conventional biomass bio-oils;

(3) partial deoxygenation: molar C:O of about 3 to about 10:1 (e.g., 3:1 to 10:1; preferably about 4 to about 8:1 (e.g., 4 to 8:1)) whereas conventional biomass pyrolysis oils have ratio of about 1.5:1;

(4) has a heating value of about 25,000 to about 36,000 (e.g., 25,000 to 36,000; preferably about 26,000 to about 32,000 (e.g., 26,000 to 32,000));

(5) contains about 15 to about 35% (e.g., 15 to 35%; preferably about 15 to about 30% (e.g., 15 to 30%); preferably about 15 to about 25% (e.g., 15 to 25%)) of the organic oxygen of the seeds from which the bio-oil was produced;

(6) carbon conversion to bio-oil: about 45 to about 90% (e.g., 45 to 90%; preferably about 50 to about 90% (e.g., 50 to 90));

(7) water content: about 1 to about 20% (e.g., 1 to 20%; preferably about 5 to about 10% (e.g., 5 to 10%). Mustard seed defatted presscake bio-oil may be produced by a process involving pyrolyzing the mustard seed defatted presscake to produce bio-oil; bio-char and non-condensable gases; removing the bio-char from the bio-oil; condensing the bio-oil; and precipitating the bio-oil.

The present invention also relates to pennycress seed defatted presscake bio-oil. The present invention relates to a pennycress seed defatted presscake bio-oil having the following characteristics: (1) has a pH of about 8.6 to about 8.9 (e.g., 8.6 to 8.9); (2) contains about 8 to about 11 wt % water (e.g., 8 to 11 wt %); (3) has a molar C:O ratio of about 4.3:1 (e.g., 4.3:1); (4) contains about 23% (e.g., 23%) of the organic oxygen in the pennycress seed defatted presscake from which the pennycress seed defatted presscake bio-oil was produced; (5) has a heating value of about 26,000 kJ/kg (e.g., 26,000); (6) the number average molecular weight of the pennycress seed defatted presscake bio-oil remains steady (changes by <about 5% (e.g., <5%)) when the mustard seed defatted presscake bio-oil is stored at 90° C. for at least 24 hours; and (7) the weight average molecular weight of the mustard seed defatted presscake bio-oil remains steady (changes by <about 5% (e.g., <5%)) when the mustard seed defatted presscake bio-oil is stored at 90° C. for at least 24 hours. Pennycress seed defatted presscake bio-oil may be produced by a process involving pyrolyzing the pennycress seed defatted presscake to produce bio-oil, bio-char and non-condensable gases; removing the bio-char from the bio-oil; condensing the bio-oil; and precipitating the bio-oil.

When produced from mustard family seeds, mustard family seed presscake (e.g., pennycress presscake, camelina presscake) or defatted mustard family seed presscake (e.g., defatted pennycress presscake), bio-oil consists of depolymerized components which are made up primarily of carbon, hydrogen, oxygen, and nitrogen. The major organic constituents in bio-oil are a liquid lignin derivative (depolymerized "liquid" lignin), alcohols, natural organic acids, and carbonyls. Water is also a major component. Bio-oil is an oxygenated organic liquid which is usually pourable and pumpable at room temperature.

Bio-oil from lignocellulosic biomass (i.e. wood) has the following characteristics: a water content from 15 to 30%, typically from 22 to 24% (in contrast the bio-oils of the present invention contain less than 15% water); pyrolytic lignin from 20 to 30%; from 10 to 20% carboxylic acids (acetic, formic, propionic and glycolic as the major carboxylic acids, with butyric, pentanoic and hexanoic present in small amounts; in contrast the bio-oils of the present invention contain less than 10 wt %); aldehydes of from 14 to 25% (primarily glycoaldehyde, glyoxal, hydroxypropanol, methyl glyoxal, and to a lesser amount formaldehyde, acetaldehyde 2-furaldehyde and syringaldehyde); from 5 to 15% sugars (levoglucosan, fructose, cellobiosan and glucose, along with others at lower concentrations including various oligosaccharides, andydroglucofuranose); ketones from about 4 to about 10% (primarily hydroxypropane, cyclopentanone, cyclopentene, furanone, hydroxymethylpyrone, and others at lower concentrations including butyrolactone, acetyloxypra- panone); alcohols from 2 to 10% (acetol, methanol, ethylene glycol); from 2 to 8% solids content; a viscosity of from 30 to 80 cSt (at 50° C.); a density of >1,1 tm$^3$ (at 15° C.); a specific gravity of from 1.15 to 1.25, typically about 1.2.

Unless defined otherwise, all technical and scientific terms used herein have the same meaning as commonly understood by one of ordinary skill in the art to which the invention belongs. The term "about" is defined as plus or minus ten percent; for example, about 100° F. means 90° F. to 110° F. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Fast Pyrolysis of Pennycress Presscake: The pennycress presscake samples were obtained from BMI Biofuels (Peoria, Ill.). After receiving the presscake, it was ground in a Wiley mill to particle sizes <2 mm and dried at 60° C. overnight.

Fast pyrolysis was carried out in a bubbling fluidized bed of quartz sand at temperatures of about 500° C. The pyrolysis system was described in detail previously by Boateng et al. (Boateng, A. A., et al., Ind. Eng. Chem. Res., 46: 1891-1897 (2007); Boateng, A. A., et al., Ind. Eng. Chem. Res., 47: 4115-4122 (2008)) and a schematic of it is shown in FIG. 1. It comprises 3 inch diameter fluidized reactor section, two cyclones in series for char, removal and collection followed by a series of four cold water jacketed condenser canisters, and a series of three electrostatic precipitators. Temperature and pressures were measured using thermocouples and pressure transducers and logged using a Labview data acquisition and control system (National Instruments, Austin, Tex.). Mass balance was carried out by gravimetric analysis of the feedstock material used versus the materials produced including bio-oil and charcoal. The uncondensed gas composition was analyzed by gas chromatography (GC) (Agilent MicroGC 3000 A). The yield values were then corrected for material that is unaccounted for (stuck in the system or not recovered) by using a mass and elemental balance model based on the compositions of the feedstock and products. The pyrolysis experiment was done twice to ensure reproducibility.

Feedstock and Product Characterization: Bio-oil water content was determined by Karl-Fischer (K-F) titration using 3:1 methanol:chloroform as solvent. Elemental analysis (C,H,N,S) on feedstock, bio-oil and bio-char was determined by combustion analysis using a Thermo Flash EA 1112 CHNS/O analyzer after which oxygen content was then determined by difference. Gross calorific value of the feedstock and products were determined using a bomb calorimeter (Parr 1281). Gas Chromatography with Mass Spectroscopy detection (GC/MS) analysis of bio-oil was performed on an Agilent 6890N GC equipped with an Agilent 5973 mass selective detector (MSD). The GC column used was a DB-1701, 60 m×0.25 mm, 0.25 µm film thickness. The oven was programmed to hold at 45° C. for 4 min, ramp at 3° C./min to 280° C. and hold for 20 min. The injector temperature was 250° C. and the injector split ratio set to 30:1. The flow rate was 1 mL/min of the He carrier gas. The bio-oil samples were prepared as ~6% solutions in acetone which were filtered through 0.45 µm PTFE filters prior to injection. For quantification, response factors relative to the internal standard, fluoroanthene, were determined for each quantified component (Oasmaa, A., and D. Meier, Characterization, Analysis, Norms and Standards, In: Fast Pyrolysis of Biomass: A Handbook, Volume 3, Bridgwater, A. V., Ed., CPL Scientific Publishing, Newbury, U.K., 2005, pp 19-43). Bio-oil pH was measured with a Thomas Scientific 675 pH/ISE meter at ambient temperature. Gel Permeation Chromatography (GPC) analysis of bio-oil was performed using a Polymer Laboratories GPC-50 (Varian, Inc.). Two Oligo-Pore® GPC columns in series were used at 35° C., and THF was used as mobile phase, at 1 mL/min flow rate. Samples were dissolved (~1 mg/mL) in THF and filtered through a PTFE filter prior to use. Peak detection was done by refractive index (RI). Accelerated aging was done by storage of the bio-oil in a sealed vial in an oven at 90° C. (Oasmaa, A., and E. Kuoppala, Energy Fuels, 17: 1075-1084 (2003)).

Results. Feedstock Characterization: The presscake samples used in this study were analyzed for residual oil, protein, and neutral detergent fiber (NDF) (Table 1) in addition to elemental analysis and gross calorific value (Table 2). The gross calorific value of the presscake was slightly higher than typical lignocellulosic biomass such as wood or herbaceous grasses (18,744 kJ/kg compared with ~17,000-18,000 kJ/kg) despite a relatively high ash content of 12% (dwb).

Figure 2:
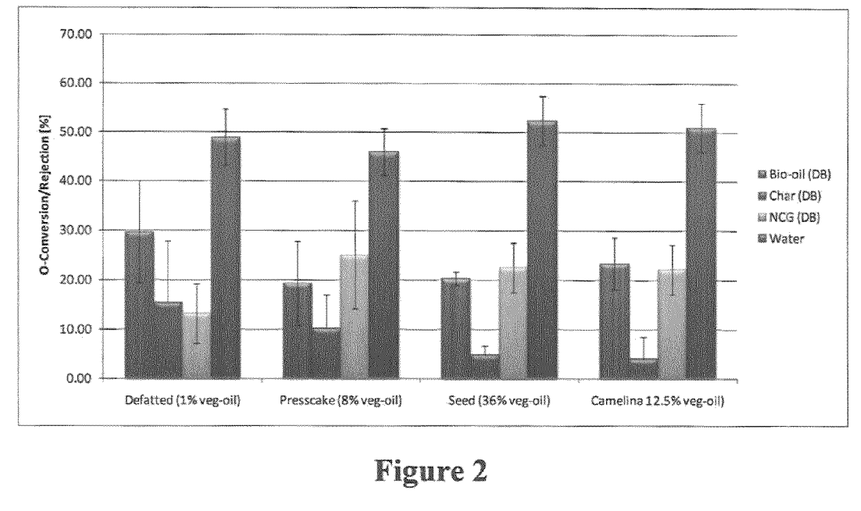
FIG. 2 shows oxygen distribution of mustard seed feedstocks into pyrolysis product; as described below
Figure 3:
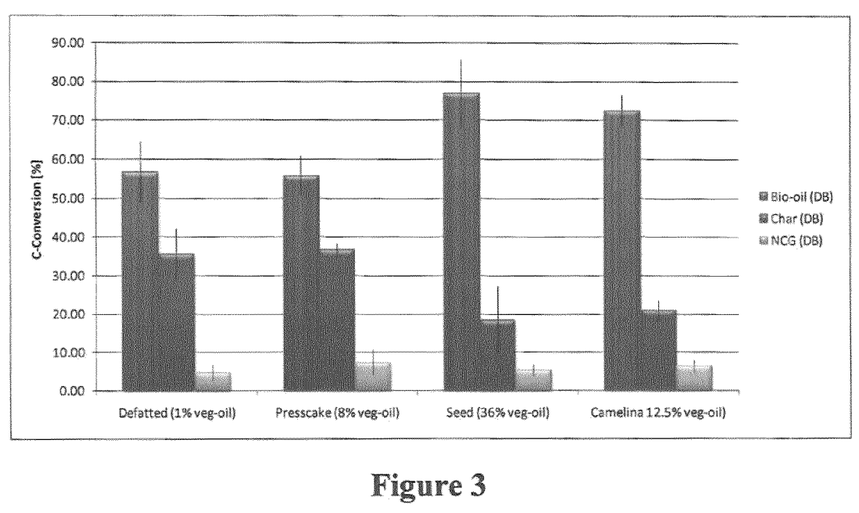
FIG. 3 shows carbon distribution of mustard seed feedstocks into pyrolysis products as described below.

Pyrolysis Product Yields: The pyrolysis of the presscake in the fluidized bed reactor system under the pyrolysis conditions produced bio-oil, bio-char, and non-condensable gases of reasonably high quantities. Table 3 lists the pyrolysis conditions used for each run. The yields of each pyrolysis product stream based on the mass balance model are found in Table 4. Of the 100 wt % presscake feedstock placed into the pyrolysis reactor, ~50 wt % was converted to liquid bio-oil, ~35 wt % to solid bio-char, and ~15 wt % to non-condensable gases. The mass balance model also determined how the oxygen and carbon in the presscake were distributed to the pyrolysis products (FIGS. 2 and 3).

Bio-oil Characterization: The bio-oil was characterized for several chemical properties and composition as described above. The concentrations of some of the chemical compounds found in the bio-oil are show in Table 5. The bio-oil exhibited several properties surprisingly unusual for fast pyrolysis bio-oils, including (1) neutral pH (7.6), (2) partial deoxygenation, and (3) molecular weight stability.

The pH of the aqueous portion of the bio-oil was surprisingly measured at ~7.6 (Table 6). To our knowledge, this was higher than any previously reported biomass pyrolysis liquid. Bio-oils produced from wood, grasses, and other typical lignocellulosic biomass have pH values of ~2-3.

Another unique feature in our process was the configuration of the condenser train system in the pyrolysis system (FIG. 1) that allowed for in situ, fractionation of bio-oil, thereby collecting most of the reaction water in the condenser fractions, leaving a large amount of low-water content bio-oil at an electrostatic precipitator system (ESP). We were surprisingly able to produce a surprisingly high amount of reaction water during the pyrolysis of the pennycress presscake, an indication of the ability to carry out deoxygenation reactions that removed oxygen as water, and the ability to separate most of this water in the condenser fractions (58 wt %), with the bio-oil collected at the ESP surprisingly containing only ~8 wt % water. The large amount of water produced was the result of a partial deoxygenation of the pyrolysis vapors, leaving the organic portion of the bio-oil with less oxygen, and therefore a surprisingly higher C:O (~3.5:1) ratio than is typical for biomass pyrolysis oils (~1.5:1; Mohan, D., et al., Energy Fuels, 20: 848-889 (2006)). The elemental analysis of the bio-oil fractions is shown in Table 7. This was further demonstrated by the surprising result that only 14% of the presscake's organic oxygen was found in the bio-oil, with 49% converted to water and 33% converted to permanent gases (FIG. 2). Our work on pyrolysis of herbaceous biomasses showed that oxygen conversion to organic bio-oil is typically 40-50% (Boateng, A. A., C.A. Mullen, Unpublished Results). The carbon conversion to bio-oil was surprisingly 52% (FIG. 3). The surprisingly high C:O ratio of the bio-oil means a higher energy content and, as a result, the bio-oil collected at the ESP had a surprisingly high heating value of 29,500 kJ/kg. This heating value of 29,500 kJ/kg was surprisingly ¾ of the value of petroleum derived heavy fuel oil and surprisingly superseded that of wood pyrolysis oils which is normally ½ of the value of petroleum derived heavy fuel oil.

Figure 4:
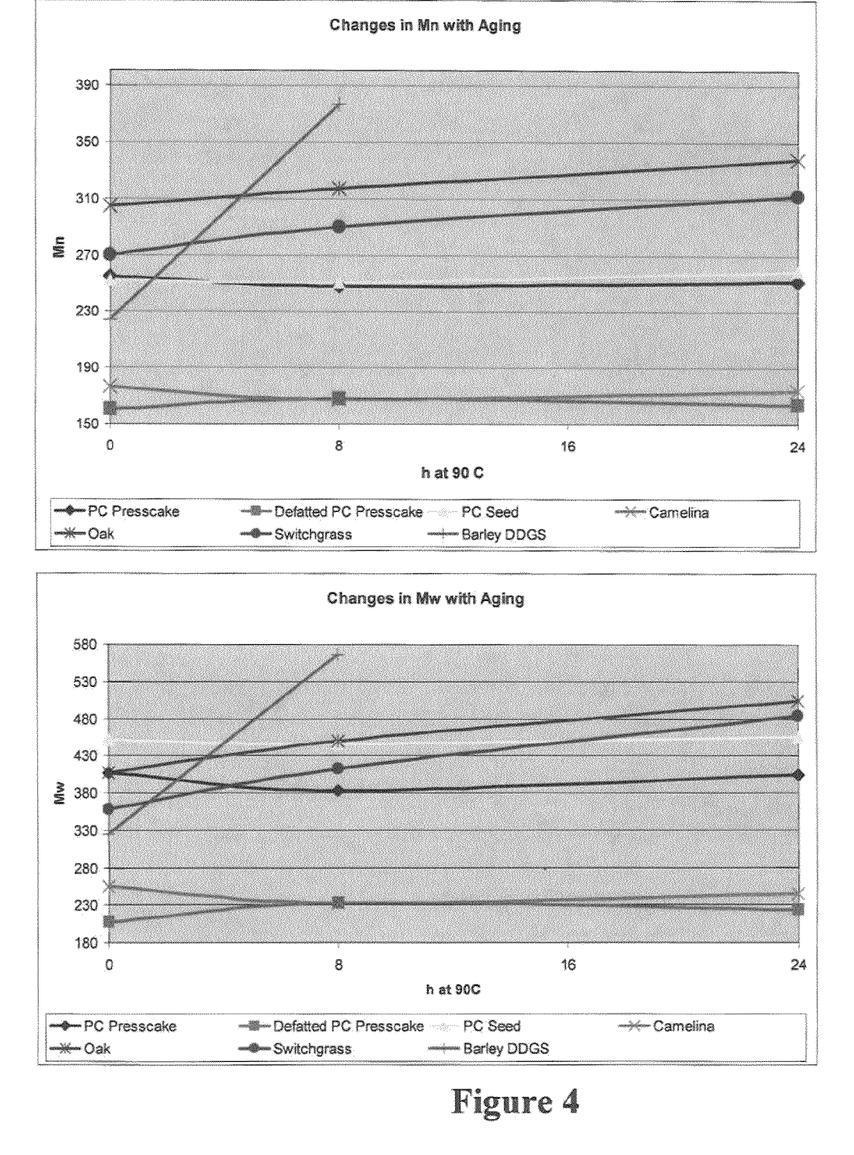
FIG. 4 shows changes in number average molecular weight (Mn) and weight average molecular weight (Mw) of ESP (electrostatic precipitator system) fraction of fast pyrolysis of bio-oils with storage at 90° C. as described below.
Figure 5:
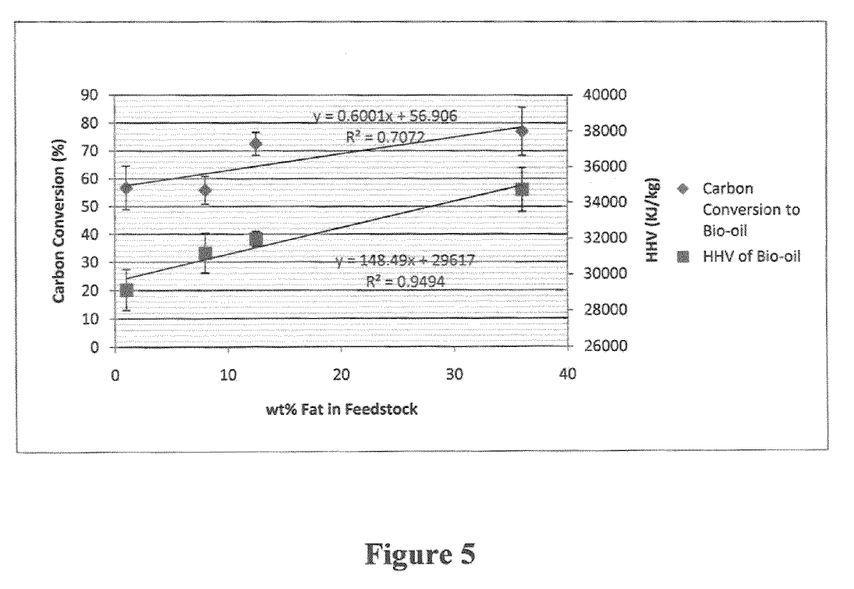
FIG. 5 shows the relationship between the amount of residual vegetable oil in the feedstock and the carbon conversion and energy content of the bio-oil as described below.

The stability of the pennycress presscake bio-oil was evaluated using Gel Permeation Chromatography (GPC) and accelerated aging conditions. GPC measures MW distributions, and the average molecular weight of bio-oils correlated with physical properties such as viscosity. Comparison of GPC results (FIG. 4) with other bio-oils produced in our laboratory revealed that the average molecular weight of the bio-oils was slightly higher for the pennycress bio-oil than the others. However, in the case of the pennycress presscake bio-oil the higher molecular weight portion was surprisingly concentrated in narrow MW distributions whereas the others had a broad range of molecular weights. After storing at 90° C. for 8 h, surprisingly the average molecular weight of the pennycress bio-oil actually decreased and remained steady during 90° C. storage to 24 h (FIG. 5). Other work on fast pyrolysis bio-oils in our laboratory, including those produced from corn cobs, barley straw, barley hulls, swithcgrass, and barley DDGS (distillers dried grains with solubles) and many examples in the literature (Garca-Prez, M., et al., Energy Fuels, 20: 786-795 (2006); Fahmi, R., et al., Fuel, 87: 1230-1240 (2008)), exhibited increasing molecular weight, representing instability due to oligomerization and condensation reactions.

Co-product Characterization: Bio-char was the major co-product of bio-oil production from pennycress presscake. It is comprised of carbon and mineral ash, and its energy content is similar to some coals which allows it to be used as a renewable solid fuel. However, bio-char may be more valuable as a soil amender that can absorb soil nutrients and slowly release them to plants while sequestering carbon for thousands of years (Laird, D. A., Agronomy J., 100: 178-181 (2008)). The bio-char produced from the pyrolysis of pennycress presscake surprisingly had an energy content of 19,010 kJ/kg, a value comparable with some coals (Weston, K. C., Energy Conversion, West Publishing Company, New York, 1992, p. 93). Its elemental analysis surprisingly showed (Table 8) that like the bio-oil it was relatively high in nitrogen (3.3%), which could further add to its value as a soil amender because soils treated with this char may require less synthetic nitrogen fertilizer.

Non-condensable gases (syngas) were the other co-product of bio-oil production. In a commercial setting these gases could be combusted and recycled to generate heat for the pyrolysis process and provide the fluidizing gas for the reactor bed. The composition of the non-condensable gases from each run is shown in Table 9.

Fast Pyrolysis of Defatted Pennycress Presscake containing only about 1% oil (i.e., >95% of seed oil removed from the original seeds): Defatted pennycress presscake is pennycress seed material that has had all or nearly all of the seed oil removed by further extraction of pennycress presscake with hexane. Defatted pennycress presscake was pyrolyzed in the same manner as described above for pennycress presscake (see also paragraph [0024] of U.S. patent application Ser. No. 12/459,107 filed 26 Jun. 2009); fast pyrolysis was carried out in a bubbling fluidized bed of quartz sand at temperatures of about 500° C. Feedstock and products were characterized in the same manner as described above for pennycress presscake (see also paragraph [0025] of U.S. patent application Ser. No. 12/459,107 filed 26 Jun. 2009). The surprising results were (1) pH (aqueous fraction) 8.6 and (2) HHV (ESP catch)=26,300 kJ/kg (as is), 29,100 (dry basis).

Pyrolysis Product Yields: The pyrolysis of the defatted pennycress presscake in the fluidized bed reactor system under the pyrolysis conditions utilized produced bio-oil, bio-char, and non-condensable gases of reasonably high quantities. Table 3 lists the pyrolysis conditions used for each run. The yields of each pyrolysis product stream based on the mass balance model are found in Table 8. Of the 100 wt % presscake feedstock placed into the pyrolysis reactor, ~60 wt % was converted to liquid bio-oil, ~34 wt % to solid bio-char, and ~6 wt % to non-condensable gases. The mass balance model also determined how the oxygen and carbon in the presscake were distributed to the pyrolysis products (FIGS. 2 and 3).

Bio-oil Characterization: The bio-oil was characterized for several chemical properties and composition as described above. The concentrations of some of the chemical compounds found in the bio-oil are shown in Table 5. The bio-oil exhibited several properties surprisingly unusual for fast pyrolysis bio-oils, including (1) neutral pH (8.6), (2) partial deoxygenation, and (3) molecular weight stability. The pH of the aqueous portion of the bio-oil was surprisingly measured at ~8.6. To our knowledge this was surprisingly higher than any previously reported biomass pyrolysis liquid other than others reported herein. Bio-oils produced from wood, grasses, and other typical lignocellulosic biomass generally have pH values of ~2-3.

Pyrolysis vapors were partially deoxygenated, leaving the organic portion of the bio-oil with surprisingly less oxygen, and therefore a surprisingly higher molar C:O (~4.3:1) ratio than is typical for biomass pyrolysis oils (~1.5:1; Mohan, D., et al., Energy Fuels, 20: 848-889 (2006)). The elemental analysis of the bio-oil fractions is shown in Table 10. This was further demonstrated by the surprising result that only 30% of the pennycress seeds' organic oxygen was found in the bio-oil, with 49% converted to water and 13% converted to permanent gases (FIG. 2). Our work on pyrolysis of herbaceous biomasses showed that oxygen conversion to organic bio-oil is typically 40-50% (Boateng, A. A., and C.A. Mullen, Unpublished Results). The carbon conversion to bio-oil was surprisingly 57% (FIG. 3). The surprisingly high C:O ratio of the bio-oil means a higher energy content and, as a result, the bio-oil collected at the ESP had a surprisingly high heating value of 26,000 kJ/kg. This heating value of 26,000 kJ/kg was surprisingly 65% of the value of petroleum derived heavy fuel oil and surprisingly superseded that of wood pyrolysis oils which is normally ½ of the value of petroleum derived heavy fuel oil.

The stability of the pennycress presscake bio-oil was evaluated using Gel Permeation Chromatography (GPC) and accelerated aging Conditions. GPC, measures MW distributions, and the weight and number average molecular weights of bio-oils correlated with physical properties such as viscosity. After storing at 90° C. for 8 h, surprisingly the average molecular weight of the pennycress bio-oil remained steady (changed by <5%) during 90° C. storage to 8 h and 24 h (FIG. 4). Other work on fast pyrolysis bio-oils in our laboratory, including those produced from corn cobs, barley straw, and barley hulls, and many examples in the literature (Garca-Prez, M., et al., Energy Fuels, 20: 786-795 (2006); Fahmi, R., et al., Fuel, 87:1230-1240 (2008)), exhibited increasing molecular weight, representing instability due to oligomerization and condensation reactions.

Fast Pyrolysis of Pennycress Seeds: Unextracted pennycress seeds were seeds as harvested and contained about 36 wt % seed vegetable oil, no oil had been extracted from them; they were ground to <2 mm. Pennycress seeds were pyrolyzed in the same manner as described above for pennycress presscake (see also paragraph [0024] of U.S. patent application Ser. No. 12/459,107 filed 26 Jun. 2009); fast pyrolysis was carried out in a bubbling fluidized bed of quartz sand at temperatures of about 500° C.

Feedstock and products were characterized in the same manner as described above for pennycress presscake (see also paragraph [0025] of U.S. patent application Ser. No. 12/459, 107 filed 26 Jun. 2009). The surprising results were (1) pH (aqueous fraction) 6.4 and (2) HHV (ESP oil catch)=34,000 kJ/kg (as is), 35,500 (dry basis).

Pyrolysis Product Yields: The pyrolysis of the pennycress seeds in the fluidized bed reactor system under the pyrolysis conditions utilized produced bio-oil, bio-char, and non-condensable gases of reasonably high quantities. Table 3 lists the pyrolysis conditions used for each run. The yields of each pyrolysis product stream based on the mass balance model are found in Table 4. Of the 100 wt % presscake feedstock placed into the pyrolysis reactor, ~73 wt % was converted to liquid bio-oil, ~17 wt % to solid bio-char, and ~9 wt % to non-condensable gases. The mass balance model also determined how the oxygen and carbon in the presscake were distributed to the pyrolysis products (FIGS. 2 and 3).

Bio-oil Characterization: The bio-oil was characterized for several chemical properties and composition as described above. The concentrations of some of the chemical compounds found in the bio-oil are show in Table 15. The bio-oil exhibited several properties surprisingly unusual for fast pyrolysis bio-oils, including (1) neutral pH (6.4), (2) partial deoxygenation, and (3) molecular weight stability.

The pH of the aqueous portion of the bio-oil was surprisingly measured at ~6.4 (Table 6). To our knowledge, this was higher than any previously reported biomass pyrolysis liquid other than others reported herein. Bio-oils produced from wood, grasses, and other typical lignocellulosic biomass have pH values of ~2-3.

Pyrolysis vapors were partially deoxygenated, leaving the organic portion of the bio-oil with surprisingly less oxygen, and therefore a surprisingly higher molar C:O (~8:1) ratio than is typical for biomass pyrolysis oils (~1.5:1; Mohan, D., et al., Energy Fuels, 20: 848-889 (2006)). The elemental analysis of the bio-oil fractions is shown in Table 11. This was further demonstrated by the surprising result that only 20% of the pennycress seed's organic oxygen was found in the bio-oil, with 52% converted to water and 22% converted to permanent gases (FIG. 2). Our work on pyrolysis of herbaceous biomasses showed that oxygen conversion to organic bio-oil is typically 40-50% (Boateng, A. A., and C.A. Mullen, Unpublished Results). The carbon conversion to bio-oil was surprisingly 77% (FIG. 3). The surprisingly high C:O ratio of the bio-oil means a higher energy content and, as a result, the bio-oil collected at the ESP had a surprisingly high heating value of 34,000 kJ/kg. This heating value of 34,000 kJ/kg was surprisingly 80% of the value of petroleum derived heavy fuel oil and surprisingly superseded that of wood pyrolysis oils which is normally % of the value of petroleum' derived heavy fuel oil.

The stability of the pennycress seed bio-oil was evaluated using Gel Permeation Chromatography (GPC) and accelerated aging conditions. GPC measures MW distributions, and the weight and number average molecular weights of bio-oils correlated with physical properties such as viscosity. After storing at 90° C. for 8 h, surprisingly the average molecular weight of the pennycress bio-oil remained steady (changed by <5%) during 90° C. storage to 8 h and 24 h (FIG. 4). Other work on fast pyrolysis bio-oils in our laboratory, including those produced from corn cobs, barley straw, and barley hulls, and many examples in the literature (Garca-Prez, M., et al., Energy Fuels, 20: 786-795 (2006); Fahmi, R., et al., Fuel, 87: 1230-1240 (2008)), exhibited increasing molecular weight, representing instability due to oligomerization and condensation reactions.

Fast Pyrolysis of Camelina Presscake: Like pennycress presscake, camelina presscake is camelina seed (*Camelina sativa* Robinson variety) that had some vegetable oil removed by mechanical pressing. Camelina presscake was pyrolyzed in the same manner as described above for pennycress presscake (see also paragraph [0024] of U.S. patent application Ser. No. 12/459,107 filed 26 Jun. 2009); fast pyrolysis was carried out in a bubbling fluidized bed of quartz sand at temperatures of about 500° C.

Feedstock and products were characterized in the same manner as described above for pennycress presscake (see also paragraph [0025] of U.S. patent application Ser. No. 12/459, 107 filed 26 Jun. 2009). The surprising results were (1) pH (aqueous fraction) 7.5 and (2) HHV (ESP)=29,700 kJ/kg (as is), 31,900 (dry basis).

Pyrolysis Product Yields: The pyrolysis of the camelina presscake in the fluidized bed reactor system under the pyrolysis conditions produced bio-oil, bio-char, and non-condensable gases of reasonably high quantities. Table 3 lists the pyrolysis conditions used for each run. The yields of each pyrolysis product stream based on the mass balance model are found in Table 18. Of the 100 wt % presscake feedstock placed into the pyrolysis reactor, ~71 wt % was converted to liquid bio-oil, ~19 wt % to solid bio-char, and ~10 wt % to non-condensable gases. The mass balance model also determined how the oxygen and carbon in the presscake were distributed to the pyrolysis products (FIGS. 2 and 3).

Bio-oil Characterization: The bio-oil was characterized for several chemical properties and composition as described above. The concentrations of some of the chemical compounds found in the bio-oil are shown in Table 5. The bio-oil exhibited several properties surprisingly unusual for fast pyrolysis bio-oils, including (1) neutral pH (7.5), (2) partial deoxygenation, and (3) molecular weight stability.

The pH of the aqueous portion of the bio-oil was surprisingly measured at ~7.5 (Table 6). To our knowledge, this was higher than any previously reported biomass pyrolysis liquid other than others reported in this patent. Bio-oils produced from wood, grasses, and other typical lignocellulosic biomass have pH values of ~2-3.

Pyrolysis vapors were partially deoxygenated, leaving the organic portion of the bio-oil with surprisingly less oxygen, and therefore a surprisingly higher molar C:O (~7.5:1) ratio than is typical for biomass pyrolysis oils (~7.5:1; Mohan, D., et al., Energy Fuels, 20: 848-889 (2006)). The elemental analysis of the bio-oil fractions is shown in Table 12. This was further demonstrated by the surprising result that only 24% of the camelina presscake's organic oxygen was found in the bio-oil, with 51% converted to water and 22% converted to permanent gases (FIG. 2). Our work on pyrolysis of herbaceous biomasses showed that oxygen conversion to organic bio-oil is typically 40-50% (Boateng, A. A., and C.A. Mullen, Unpublished Results). The carbon conversion to bio-oil was surprisingly 72% (FIG. 3). The surprisingly high C:O ratio of the bio-oil means a higher energy content and, as a result, the bio-oil collected at the ESP had a surprisingly high heating value of 29,700 kJ/kg. This heating value of 29,700 kJ/kg was surprisingly ¾ of the value of petroleum derived heavy fuel oil and surprisingly superseded that of wood pyrolysis oils which is normally ½ of the value of petroleum derived heavy fuel oil.

The stability of the camelina presscake bio-oil was evaluated using Gel Permeation Chromatography (GPC) and accelerated aging conditions. GPC measures MW distributions, and the weight and number average molecular weights of bio-oils correlated with physical properties such as viscosity. After storing at 90° C. for 8 h, surprisingly the average molecular weight of the pennycress bio-oil remained steady (changed by <5%) during 90° C. storage to 8 h and 24 h (FIG. 4). Other work on fast pyrolysis bio-oils in our laboratory, including those produced from corn cobs, barley straw, and barley hulls, and many examples in the literature (Garca-Prez, M., et al., Energy Fuels, 20: 786-795 (2006); Fahmi, R., et al., Fuel, 87: 1230-1240 (2008)), exhibited increasing molecular weight, representing instability due to oligomerization and condensation reactions.

Bio-oils were produced by fast pyrolysis of mustard family of oil seeds, presscakes, and defatted presscakes. Aside from the very high yields (up to 70 wt %) and high energy dense liquid fuel intermediates produced, the liquids were uniquely and surprisingly stable. The bio-oils produced from mustard seed materials had surprisingly high pH (e.g., in the neutral 6-9 range) compared with other bio-oils (e.g., wood, grasses). The carbon conversion efficiency was very high, with the bio-oil constituting some 60-80% of the feedstock carbon. Additionally, the liquids were surprisingly deoxygenated compared with the mustard seed material feedstocks. This, thereby resulted in unusually high calorific value for pyrolysis based bio-fuel intermediates (29-34.7 MJ/kg). Because stability is a major barrier to commercialization of pyrolysis liquids as second generation biofuels, the results are very encouraging with the potential to use the mustard family seed materials for producing advanced biofuels without the stability problems associated with liquids produced from conventional lignocellulosic feedstocks.

All of the references cited herein, including U.S. Patents, are incorporated by reference in their entirety. Also incorporated by reference in their entirety are the following references: U.S. Pat. No. 6,485,841; U.S. Patent Application Publication No. 20090031616; Abdullah, N., and H. Gerhauser, Fuel, 47: 2606-2613 (2008); Onay, O., and O. M. Koskar, Renewable Energy, 2003, 28:2417-2433 (2003); Özçimen, D., and F. Karaosmanoglu, Renewable Energy, 29: 779-787 (2004)); Sensöz, S., et al., Biomass Bioenergy, 19: 271-279 (2000).

Thus, in view of the above, the present invention concerns (in part) the following:

Bio-oil produced from a feedstock wherein said feedstock is selected from the group consisting of mustard seeds; mustard seed presscake, defatted mustard seed presscake, and mixtures thereof;

(a) wherein said bio-oil produced from said mustard seeds has the following characteristics:

(1) the average molecular weight and number average weight of said bio-oil changes by <about 5% during 90° C. storage for up to 24 hours, (2) pH of about 6.0 about 8.0, (3) molar C:O of about 4 to about 10:1, (4) has a heating value of about 26,000 to about 38,000 kJ/kg, (5) contains about 15 to about 35% of the organic oxygen of the seeds from which the bio-oil was produced;

(6) carbon conversion to bio-oil of about 45 to about 90%, and (7) water content of about 1 to about 20%;

(b) wherein said bio-oil produced from said mustard seed presscake has the following characteristics:

(1) the number average molecular weight and the weight average molecular weight of said bio-oil decreases <about 20% or increases by <about 5% when the presscake bio-oil is stored at 90° C. for up to 24 hours, (2) pH of about 6 to about 8, (3) molar C:O of about 3.5 to about 8.5:1, (4) has a heating value of about 26,000 to about 38,000 kJ/kg, (5) contains about 14 to about 35% of the organic oxygen of the seeds from which the bio-oil was produced (6) carbon conversion to bio-oil of about 45 to about 90%, (7) water content of about 1 to about 20%; and (c) wherein said bio-oil produced, from said defatted mustard seed presscake has the following characteristics:

(1) the number average molecular weight and weight average molecular weight of said bio-oil changes by <5% when said bio-oil is stored at 90° C. for up to 24 hours, (2) pH of about 6.0 to about 9.0, (3) molar C:O of about 3 to about 10, (4) has a heating value of about 25,000 to about 36,000, (5) contains about 15 to about 35% of the organic oxygen of the seeds from which the bio-oil was produced, (6) carbon conversion to bio-oil of about 45 to about 90%, and (7) water content of about 1 to about 20%.

The above bio-oil, wherein said feedstock is mustard seeds (e.g., camelina, pennycress, or canola but not rapeseed). The above bio-oil, wherein said mustard seeds are pennycress.

The above bio-oil, wherein said feedstock is mustard seed (e.g., camelina, pennycress, or canola but not rapeseed) presscake. The above bio-oil, wherein said mustard seed presscake is selected from the group consisting of pennycress presscake, camelina presscake, and mixtures thereof. The above bio-oil, wherein said mustard seed presscake is pennycress presscake. The above bio-oil, wherein said mustard seed presscake is camelina presscake.

The above bio-oil, wherein said feedstock is defatted mustard seed (e.g., camelina, pennycress, or canola but not rapeseed) presscake. The above bio-oil, wherein said defatted mustard seed presscake is defatted pennycress presscake.

The above bio-oil, wherein said bio-oil is produced by a method comprising (or consisting essentially of or consisting of) (1) pyrolyzing said feedstock to produce bio-oil, bio-char and non-condensable gases; (2) removing said bio-char from said bio-oil; (3) condensing said bio-oil; and (4) precipitating said bio-oil. The bio-oil, wherein said bio-oil is produced by a method comprising (or consisting essentially of or consisting of) (1) pyrolyzing said feedstock at a temperature of about 450° to about 550° C. for about 0.1 second to about 5 seconds to produce bio-oil, bio-char and non-condensable gases; (2) removing said bio-char from said bio-oil; (3) condensing said bio-oil; and (4) precipitating said bio-oil. The bio-oil, wherein said bio-oil is produced by a method comprising (or consisting essentially of or consisting of) (1) pyrolyzing said feedstock at a temperature of about 500° C. for about 0.1 second to about 0.7 second to produce bio-oil, bio-char and non-condensable gases; (2) removing said bio-char from said bio-oil; (3) condensing said bio-oil; and (4) precipitating said bio-oil.

A method for producing bio-oil from a feedstock, said method comprising (or consisting essentially of or consisting of) (1) pyrolyzing said feedstock to produce bio-oil, bio-char and non-condensable gases; (2) removing said bio-char from said bio-oil; (3) condensing said bio-oil; and (4) precipitating said bio-oil; wherein said feedstock is selected from the group consisting of mustard seeds, mustard seed presscake, defatted mustard seed presscake, and mixtures thereof. The method, wherein method comprises (or consists essentially of or consists of) (1) pyrolyzing said feedstock at a temperature of about 450° to about 550° C. for about 0.1 second to about 5 seconds to produce bio-oil, bio-char and non-condensable gases; (2) removing said bio-char from said bio-oil; (3) condensing said bio-oil; and (4) precipitating said bio-oil. The method, wherein said method comprises (or consisting essentially of or consisting of) (1) pyrolyzing said feedstock at a temperature of about 500° C. for about 0.1 second to about 0.7 second to produce bio-oil, bio-char and non-condensable gases; (2) removing said bio-char from said bio-oil; (3) condensing said bio-oil; and (4) precipitating said bio-oil.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Composition of pennycress presscake used in this study

| Component | Wt % |
|---|---|
| Ash | 12.08 |
| Oil | 7.90 |
| Protein | 27.84 |
| Neutral Detergent Fiber | 43.62 |

TABLE 2

Composition and heating values of feedstocks used in this study of

| | PC[b] Presscake | Defatted PC[b] Presscake | PC[b] Seed | Camelina Presscake |
|---|---|---|---|---|
| water (wt %) | 3.06 | 2.59 | 2.84 | 2.64 |
| carbon (wt %) | 44.79 | 42.08 | 53.89 | 49.55 |
|  | (53.15) | (49.43) | (59.13) | (53.73) |
| hydrogen | 5.32 | 5.41 | 7.37 | 6.81 |
| (wt %, organic) | (6.31) | (6.35) | (8.08) | (7.38) |
| nitrogen | 5.66 | 5.90 | 3.92 | 5.81 |
| (wt %) | (6.72) | (6.93) | (4.30) | (6.30) |
| sulfur (wt %) | 1.29 | 0.84 | 0.66 | 0.86 |
|  | (1.48) | (0.98) | (0.72) | (0.93) |
| oxygen | 27.26 | 30.93 | 25.30 | 29.19 |
| (wt %, organic) | (32.34) | (36.32) | (27.76) | (31.67) |
| ash (wt %) | 12.08 | 12.27 | 6.02 | 4.96 |
| lipid (wt %, dry basis) | 7.90 | 1.56 | 29.60 | 12.53 |
|  | (8.99) | (1.78) | (31.5) | (13.30) |
| HHV (MJ/kg) | 18.7 | 17.8 | 25.1 | 21.8 |
|  | (22.2) | (21.1) | (27.6) | (23.5) |
| HHV (BTU/lb) | 8,040 | 7,652 | 10,791 | 9,372 |
|  | (9,544) | (9,071) | (11,866) | (10,103) |

[a]In parentheses are dry-ash-free values.
[b]PC = Pennycress.

TABLE 3

Operational conditions for fluidized-bed pyrolysis of pennycress and camelina

| Condition | Value |
|---|---|
| Fluidized-Bed Material | Silica Sand |
| Particle Size (Bed Material) US Mesh | −20 + 25 |
| Fluidizing Gas | $N_2$ |
| Gas Flow Rate (L/min) | 100 |
| Min. Fluidization Velocity (m/s) | 0.23 |
| Superficial Velocity (m/s) | 0.65 |
| Biomass Feed Rate (g/h) | 1300-2700 |
| Biomass:$N_2$ Ratio | 0.46 |
| Feed Mean Particle Size (mm) | <2 |
| Bed Temperature (° C.) | 495-505 |
| Condenser #1 Temperature (° C.) | 248-310 |
| Condenser #4 Temperature (° C.) | 30-39 |
| ESP[a] Temperature (° C.) | 19-32 |
| Estimated Heat Rate (° C./s) | 3826-4577 |
| Total Quench Rate (−° C./s) | 50-60 |

[a]ESP = Electrostatic precipitator

TABLE 4

Pyrolysis product distribution.

| | PC Presscake | Defatted PC Presscake | PC Seed | Camelina Presscake |
|---|---|---|---|---|
| Bio-oil | 51.40 | 59.57 | 73.20 | 71.31 |
| Bio-char | 34.99 | 34.18 | 18.58 | 18.58 |
| Non-Condensable Gas (NCG) | 14.61 | 6.25 | 10.21 | 10.12 |

TABLE 5

Pyrolysis oil components via GC/MS (wt %)

| Compound (wt %) | PC[a] Cake | Defatted PC[a] Cake | PC[a] Seed | Camelina Cake |
|---|---|---|---|---|
| acetic acid | 6.00 | 6.22 | 6.11 | 6.29 |
| furfural | 0 | 0 | 0 | 0 |
| furfuryl alcohol | 0.12 | 0.25 | 0.19 | 0.39 |
| hydroxyacet-aldehyde | 0 | 0 | 0 | 0 |
| acetol | 0 | 0 | 0 | 0 |
| levoglucosan | 2.06 | 2.44 | 0.81 | 1.48 |
| phenol | 0.33 | 0.44 | 0.30 | 0.34 |
| guaiacol | 0.13 | 0.25 | 0.21 | 0.15 |
| syringol | 0.05 | 0.19 | 0.17 | 0.17 |
| indole | 0.13 | 0.06 | 0.06 | 0.07 |
| pyrrole | 0.11 | 0.12 | 0.08 | 0.15 |

[a]PC = pennycress

TABLE 6

Acidity of Bio-oils

| bio-oil produced | pH (aq phase) | TAN (mg KOH/g) |
|---|---|---|
| defatted pennycress presscake | 8.6 | 62.91 |
| defatted pennycress presscake | 8.9 | 64.44 |
| pennycress presscake | 8.3 | 83.23 |
| pennycress presscake | 7.5 | 84.74 |
| pennycress seed | 6.4 | 64.15 |
| pennycress seed | 6.4 | 96.86 |
| camelina | 7.5 | 70.70 |
| camelina | 7.5 | 64.55 |
| perennial grasses (switchgrass) | 2.3 | 157 |
| wood (oak) | 2.2-2.5 | 130 |
| legumes (alfalfa) | 5.6 | 70.13 |
| barley DDGS | 6.5 | 59.28 |

TABLE 7

Elemental analysis of pennycress presscake bio-oil fractions[a].

| | Bio-oil - ESP Fraction | Bio-oil - ESP Fraction Dry Basis | Bio-oil - Condenser Fractions | Bio-oil - Condenser Fractions Dry Basis | Bio-oil - Whole | Bio-oil - Whole Dry Basis |
|---|---|---|---|---|---|---|
| % Water | 7.56 | — | 58.09 | — | 42.98 | — |
| % C | 67.20 | 72.69 | 20.25 | 48.45 | 34.18 | 59.82 |
| % H | 8.36 | 9.05 | 2.47 | 5.91 | 4.23 | 7.40 |
| % N | 5.82 | 4.53 | 6.92 | 16.57 | 6.55 | 11.51 |
| % S | 0.59 | 0.64 | 2.16 | 5.19 | 1.68 | 2.95 |
| % O | 10.47 | 13.09 | 10.10 | 21.44 | 10.37 | 18.32 |

[a]Average of two runs

TABLE 8

Elemental Analysis and HHV of Bio-char Co-product[a]

| | PC[b] Presscake | Defatted PC[b] Presscake | PC[b] Seed | Camelina Presscake |
|---|---|---|---|---|
| carbon | 48.32 | 43.69 | 58.45 | 60.55 |
| (wt %) | (78.49) | (69.60) | (81.88) | (84.82) |
| hydrogen | 2.43 | 2.09 | 2.71 | 2.86 |
| (wt %, organic) | (3.89) | (3.32) | (3.79) | (4.00) |
| nitrogen | 2.89 | 2.36 | 2.16 | 4.96 |
| (wt %) | (4.70) | (3.76) | (3.02) | (6.93) |
| sulfur | 0.36 | 0.23 | 0 | 0.42 |
| (wt %) | (0.58) | (0.37) | (0.00) | (0.58) |
| oxygen | 7.63 | 14.56 | 8.07 | 2.64 |
| (wt %, organic) | (12.28) | (22.95) | (11.30) | (3.66) |
| ash (wt %) | 38.35 | 36.78 | 26.62 | 27.58 |
| HHV (MJ/kg) | 18.8 | 18.8 | 22.6 | 15.1 |
|  | (30.4) | (30.7) | (31.6) | (19.2) |
| HHV (BTU/lb) | 8,083 | 8,084 | 9,716 | 6,492 |
|  | (13,070) | (13,199) | (13,586) | (8,255) |

[a]In parentheses are dry-ash-free values.
[b]PC = Pennycress.

TABLE 9

Composition of Non Condensable Gas Co-products (mol %)[a]

|  | Pennycress Presscake | Defatted Pennycress | Pennycress Seed | Camelina |
|---|---|---|---|---|
| $CO_2$ | 69.10 (2.49) | 68.71 (0.34) | 58.41 (0.38) | 66.27 (4.67) |
| CO | 23.00 (2.56) | 24.44 (0.98) | 27.09 (0.64) | 25.79 (1.63) |
| $H_2$ | 1.81 (1.88) | 1.54 (0.67) | 7.48 (3.00) | 1.87 (1.45) |
| $CH_4$ | 6.09 (0.69) | 5.84 (0.17) | 7.02 (4.02) | 6.07 (1.66) |
| $Kcal/m^3$ | 1283.4 | 1166 | 1424 | 1272 |

[a]Average values of multiple runs. Standard deviations of averages are in parenthesis.

TABLE 10

Elemental Analysis of Bio-oil from Defatted PC Presscake

|  | Bio-oil - ESP Fraction | Bio-oil - ESP Fraction Dry Basis | Bio-oil - Condenser Fractions | Bio-oil Condenser Fractions Dry Basis | Bio-oil - Whole | Bio-oil - Whole Dry Basis |
|---|---|---|---|---|---|---|
| wt % Water | 10.07 | — | 67.73 | — | 36.89 | — |
| wt % C | 54.34 | 60.39 | 20.45 | 62.25 | 33.09 | 53.54 |
| wt % H[a] | 5.09 | 6.90 | 0.96 | 2.83 | 3.14 | 5.05 |
| wt % N | 9.66 | 10.45 | 5.02 | 15.75 | 8.69 | 13.49 |
| wt % S | 1.03 | 1.17 | 0.64 | 1.76 | 0.89 | 1.54 |
| wt % O[a] | 18.95 | 21.09 | 5.21 | 17.41 | 19.80 | 29.87 |
| C:O (mol) | 3.8:1 | 3.8:1 | 5.2:1 | 4.8:1 | 2.2:1 | 2.4:1 |

[a]Hydrogen and Oxygen values are organic only (excluding water)

TABLE 11

Elemental Analysis of Bio-oil from Pennycress Seeds

|  | Bio-oil - ESP Fraction | Bio-oil - ESP Fraction Dry Basis | Bio-oil - Condenser Fractions | Bio-oil Condenser Fractions Dry Basis | Bio-oil - Whole | Bio-oil - Whole Dry Basis |
|---|---|---|---|---|---|---|
| % Water | 7.84 | | 3.86 | | 4.42 | |
| % C | 65.93 | 72.45 | 72.07 | 74.98 | 69.92 | 73.15 |
| % H | 8.55 | 9.59 | 9.68 | 10.07 | 9.41 | 9.85 |
| % N | 5.63 | 4.64 | 3.94 | 4.00 | 4.45 | 4.66 |
| % S | 0.40 | 0.24 | 0.00 | 0.00 | 0.10 | 0.10 |
| % O | 11.65 | 13.08 | 10.45 | 10.95 | 11.70 | 12.24 |
| C:O (mol) | 7.5:1 | 7.6:1 | 9.2:1 | 9.1:1 | 8.0:1 | 8.0:1 |

TABLE 12

Elemental Analysis of Bio-oil from Camelina Presscake

|  | Bio-oil - ESP Fraction | Bio-oil - ESP Fraction Dry Basis | Bio-oil - Condenser Fractions | Bio-oil Condenser Fractions Dry Basis | Bio-oil - Whole | Bio-oil - Whole Dry Basis |
|---|---|---|---|---|---|---|
| % Water | 7.12 | | 40.89 | | 22.39 | |
| % C | 64.79 | 69.75 | 35.77 | 59.35 | 52.03 | 66.29 |
| % H | 8.02 | 8.63 | 6.36 | 7.28 | 7.20 | 8.85 |
| % N | 7.94 | 8.55 | 7.75 | 9.20 | 7.66 | 8.95 |
| % S | 0.34 | 0.37 | 0.70 | 0.98 | 0.48 | 0.58 |
| % O | 11.79 | 12.69 | 15.78 | 23.19 | 13.03 | 15.34 |
| C:O (mol) | 7.3:1 | 7.3:1 | 3.0:1 | 3.0:1 | 5.3:1 | 5.3:1 |

We claim:

1. Bio-oil produced from mustard family seeds, wherein said bio-oil is produced by a method comprising (1) pyrolyzing said mustard family seeds at a temperature of about 450° to about 550° C. for about 0.1 second to about 5 seconds to produce bio-oil, bio-char and non-condensable gases; (2) removing said bio-char from said bio-oil; (3) condensing said bio-oil; and (4) precipitating said bio-oil;
   wherein said bio-oil produced from said mustard family seeds has the following characteristics:
   (1) the average molecular weight and number average weight of said bio-oil changes by less than about 5% during 90° C. storage for up to 24 hours,
   (2) pH of about 6.0 about 8.0,
   (3) molar C:O of about 4:1 to about 10:1,
   (4) has a heating value of about 26,000 to about 38,000 kJ/kg,
   (5) contains about 15 to about 35% of the organic oxygen of the seeds from which the bio-oil was produced;
   (6) carbon conversion to bio-oil of about 45 to about 90%, and
   (7) water content of about 1 to about 20%;
   wherein said mustard family seeds are selected from the group consisting of mustard seeds, pennycress seeds, camelina seeds, canola seeds, and mixtures thereof.

2. The bio-oil according to claim 1, wherein said mustard family seeds are pennycress seeds.

3. The bio-oil according to claim 1, wherein said bio-oil has the following characteristics:
   (1) the average molecular weight and number average weight of said bio-oil changes by less than about 5% during 90° C. storage for up to 24 hours,
   (2) pH of about 6.4,
   (3) molar C:O of about 8:1,
   (4) has a heating value of about 34,000 kJ/kg,
   (5) contains about 20% of the organic oxygen of the seeds from which the bio-oil was produced;
   (6) carbon conversion to bio-oil of about 45 to about 90%, and
   (7) water content of about 4 to about 11%;
   wherein said mustard family seeds are pennycress seeds.

4. The bio-oil according to claim 1, wherein said bio-oil is produced by a method comprising (1) pyrolyzing said mustard family seeds at a temperature of about 500° C. for about 0.1 second to about 0.7 second to produce bio-oil, bio-char and non-condensable gases; (2) removing said bio-char from said bio-oil; (3) condensing said bio-oil; and (4) precipitating said bio-oil.

5. Bio-oil produced from mustard family seed presscake, wherein said bio-oil is produced by a method comprising (1) pyrolyzing said mustard family seed presscake at a temperature of about 450° to about 550° C. for about 0.1 second to about 5 seconds to produce bio-oil, bio-char and non-condensable gases; (2) removing said bio-char from said bio-oil; (3) condensing said bio-oil; and (4) precipitating said bio-oil;
   wherein said bio-oil produced from said mustard family seed presscake has the following characteristics:
   (1) the number average molecular weight and the weight average molecular weight of said bio-oil decreases less than about 20% or increases by less than about 5% when the presscake bio-oil is stored at 90° C. for up to 24 hours,
   (2) pH of about 6 to about 8,
   (3) molar C:O of about 3.5:1 to about 8.5:1,
   (4) has a heating value of about 26,000 to about 38,000 kJ/kg, (5) contains about 14 to about 35% of the organic oxygen of the seeds from which the bio-oil was produced,
(6) carbon conversion to bio-oil of about 45 to about 90%, and
(7) water content of about 1 to about 20%;
wherein said mustard family seed presscake are selected from the group consisting of mustard seed presscake, pennycress seed presscake, camelina seed presscake, canola seed presscake, and mixtures thereof.

6. The bio-oil according to claim 5, wherein said mustard family seed presscake is camelina seed presscake or pennycress seed presscake.

7. The bio-oil according to claim 5, wherein said bio-oil has the following characteristics:
(1) the number average molecular weight decreases and the weight average molecular weight of said bio-oil decreases by about 5 to about 8% when said bio-oil is stored at 90° C. for up to 24 hours,
(2) pH of about 7.5,
(3) molar C:O of about 7.5:1,
(4) has a heating value of about 29,700 kJ/k,
(5) contains about 24% of the organic oxygen of the seeds from which the bio-oil was produced,
(6) carbon conversion to bio-oil of about 45 to about 90%, and
(7) water content of about 7 to about 9%;
wherein said mustard family seed presscake is camelina seed presscake.

8. The bio-oil according to claim 5, wherein said bio-oil has the following characteristics:
(1) the number average molecular weight decreases by about 11% and the weight average molecular weight of said bio-oil decreases by about 13 to about 16% when the presscake bio-oil is stored at 90° C. for up to 24 hours,
(2) pH of about 7.6,
(3) molar C:O of about 3.5:1,
(4) has a heating value of about 29,500 kJ/kg,
(5) contains about 14% of the organic oxygen of the seeds from which the bio-oil was produced,
(6) carbon conversion to bio-oil of about 45 to about 90%, and
(7) water content of about 8%;
wherein said mustard family seed presscake is pennydress seed presscake.

9. The bio-oil according to claim 5, wherein said bio-oil is produced by a method comprising (1) pyrolyzing said mustard family seed presscake at a temperature of about 500° C. for about 0.1 second to about 0.7 second to produce bio-oil, bio-char and non-condensable gases; (2) removing said bio-char from said bio-oil; (3) condensing said bio-oil; and (4) precipitating said bio-oil.

10. Bio-oil produced from defatted mustard family seed presscake, wherein said bio-oil is produced by a method comprising (1) pyrolyzing said defatted mustard family seed presscake at a temperature of about 450° to about 550° C. for about 0.1 second to about 5 seconds to produce bio-oil, bio-char and non-condensable gases; (2) removing said bio-char from said bio-oil; (3) condensing said bio-oil; and (4) precipitating said bio-oil;
wherein said bio-oil produced from said defatted mustard family seed presscake has the following characteristics:
(1) the number average molecular weight and weight average molecular weight of said bio-oil changes by less than 5% when said bio-oil is stored at 90° C. for up to 24 hours,
(2) pH of about 6.0 to about 9.0,
(3) molar C:O of about 3:1 to about 10:1,
(4) has a heating value of about 25,000 to about 36,000,
(5) contains about 15 to about 35% of the organic oxygen of the seeds from which the bio-oil was produced,
(6) carbon conversion to bio-oil of about 45 to about 90%, and
(7) water content of about 1 to about 20%;
wherein said defatted mustard family seed presscake are selected from the group consisting of defatted mustard seed presscake, defatted pennycress seed presscake, defatted camelina seed presscake, defatted canola seed presscake, and mixtures thereof.

11. The bio-oil according to claim 10, wherein said defatted mustard family seed presscake is defatted pennycress seed presscake.

12. The bio-oil according to claim 10, wherein said bio-oil has the following characteristics:
(1) the number average molecular weight and weight average molecular weight of said bio-oil changes by less than 5% when said bio-oil is stored at 90° C. for up to 24 hours,
(2) pH of about 8.6 to about 8.9,
(3) molar C:O of about 4.3:1,
(4) has a heating value of about 26,000,
(5) contains about 23% of the organic oxygen of the seeds from which the bio-oil was produced,
(6) carbon conversion to bio-oil of about 45 to about 90%, and
(7) water content of about 8 to about 11%;
wherein said defatted mustard family seed presscake is defatted pennycress seed presscake.

13. The bio-oil according to claim 10, wherein said bio-oil is produced by a method comprising (1) pyrolyzing said defatted mustard family seed presscake at a temperature of about 500° C. for about 0.1 second to about 0.7 second to produce bio-oil, bio-char and non-condensable gases; (2) removing said bio-char from said bio-oil; (3) condensing said bio-oil; and (4) precipitating said bio-oil.

14. A method for producing bio-oil from a feedstock, said method comprising pyrolyzing said feedstock at a temperature of about 450° to about 550° C. for about 0.1 second to about 5 seconds to produce bio-oil, bio-char and non-condensable gases; (2) removing said bio-char from said bio-oil; (3) condensing said bio-oil; and (4) precipitating said bio-oil;
wherein said feedstock is mustard family seeds selected from the group consisting of mustard seeds, pennycress seeds, camelina seeds, canola seeds, and mixtures thereof.

15. The method according to claim 14, wherein said method comprises (1) pyrolyzing said feedstock at a temperature of about 500° C. for about 0.1 second to about 0.7 second to produce bio-oil, bio-char and non-condensable gases; (2) removing said bio-char from said bio-oil; (3) condensing said bio-oil; and (4) precipitating said bio-oil.

16. A method for producing bio-oil from a feedstock, said method comprising pyrolyzing said feedstock at a temperature of about 450° to about 550° C. for about 0.1 second to about 5 seconds to produce bio-oil, bio-char and non-condensable gases; (2) removing said bio-char from said bio-oil; (3) condensing said bio-oil; and (4) precipitating said bio-oil;
wherein said feedstock is mustard family seed presscake selected from the group consisting of mustard seed presscake, pennycress seed presscake, camelina seed presscake, canola seed presscake, and mixtures thereof.

17. The method according to claim 16, wherein said method comprises (1) pyrolyzing said feedstock at a temperature of about 500° C. for about 0.1 second to about 0.7 second to produce bio-oil, bio-char and non-condensable gases; (2) removing said bio-char from said bio-oil; (3) condensing said bio-oil; and (4) precipitating said bio-oil.

18. A method for producing bio-oil from a feedstock, said method comprising pyrolyzing said feedstock at a temperature of about 450° to about 550° C. for about 0.1 second to about 5 seconds to produce bio-oil, bio-char and non-condensable gases; (2) removing said bio-char from said bio-oil; (3) condensing said bio-oil; and (4) precipitating said bio-oil; wherein said feedstock is defatted mustard family seed presscake selected from the group consisting of defatted mustard seed presscake, defatted pennycress seed presscake, defatted camelina seed presscake, defatted canola seed presscake, and mixtures thereof.

19. The method according to claim 18, wherein said method comprises (1) pyrolyzing said feedstock at a temperature of about 500° C. for about 0.1 second to about 0.7 second to produce bio-oil, bio-char and non-condensable gases; (2) removing said bio-char from said bio-oil; (3) condensing said bio-oil; and (4) precipitating said bio-oil.

* * * * *